Aug. 18, 1936.   O. BRATZ   2,051,590
METHOD OF ASSEMBLING POWER TRANSMITTING DEVICES
Filed Nov. 13, 1933
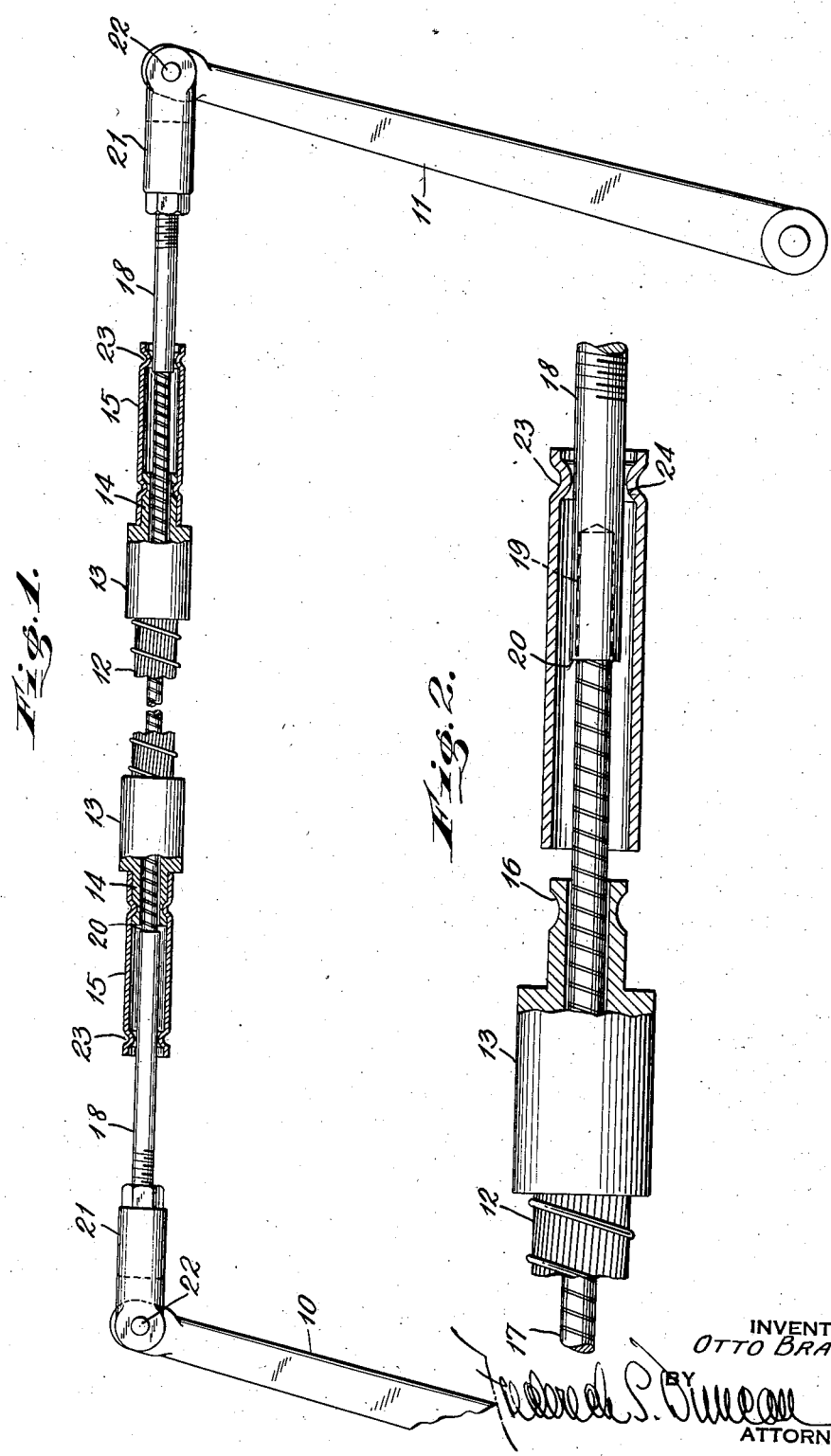
INVENTOR
OTTO BRATZ
BY
ATTORNEY Patented Aug. 18, 1936

2,051,590

UNITED STATES PATENT OFFICE 2,051,590

METHOD OF ASSEMBLING POWER TRANSMITTING DEVICES

Otto Bratz, Adrian, Mich., assignor to American Cable Company, Inc., Bridgeport, Conn., a corporation of Delaware Application November 13, 1933, Serial No. 697,878

6 Claims. (Cl. 29—148)

My invention relates to power transmitting devices of the reciprocating type comprising a tubular casing or guide member through which passes an elongated tension and/or compression member, power being transmitted by effecting longitudinal movement of one member with respect to the other, and an object of the invention is to provide a novel method of assembling such devices.

The invention relates more particularly to power transmitting devices of the type in which the inner member is flexible and has rigid rod-like extensions at opposite ends thereof which slide in rigid sleeves extending from opposite ends of the casing. Such rod extensions are usually swedged upon the ends of the flexible members and hence form shoulders which are liable to catch on the ends of the sleeves unless these sleeves extend beyond the extreme outer positions of such shoulders. It is desirable, therefore, to make the length of the casing member from the outer extremity of one sleeve to that of the other sleeve greater than the spacing between the rods plus the maximum range of relative movement of the two members. However, this raises a problem in assembling. It is impossible to swedge a terminal rod on the inner flexible member while it lies within the sleeve and an object of the present invention is to provide a method of construction and assembly which will overcome this difficulty.

A further object of the invention is to provide a method of constructing and assembling a power transmitting device of the type in which bearings or fulcrum means are provided for relative oscillation of the terminal rods and sleeves. A power device of this type is illustrated in my copending application Serial No. 697,877, filed concurrently herewith, now Patent No. 2,018,345, Oct. 22, 1935.

Other objects of my invention will appear in the following specification illustrating a power-transmitting device and method of assembling the same and thereafter the novelty and scope of the invention will be pointed out in the claims.

In the accompanying drawing;

Figure 1 is a view in side elevation and partly in section of a power-transmitting device constructed and assembled in accordance with my improved method; and Fig. 2 is a fragmental side view on a larger scale and also partly in section illustrating a step in the assembly of the device.

The power-transmitting device is shown in Fig. 1 as connecting two pivoted arms 10 and 11, either one of which may be a driving member and the other a driven member; also each member may be alternately a driver and a driven member. Said device comprises a flexible tubular casing 12, of well known structure, comprising a set of wires securely bound at each end by ferrules 13. Each ferrule is formed at its outer end with a portion 14 of reduced diameter on which an extension sleeve 15 is fitted. Each part 14 of the ferrule is formed with an annular groove 16 in which the sleeve is swedged, thereby rigidly affixing the sleeve to the ferrule. The sleeve extends to a considerable distance beyond the ferrule and forms a rigid extension of the tubular casing 12.

Fitted to slide within the casing 12 is an extended flexible member 17. This may consist of a wire, a flexible rod, a cable strand or any other body which may serve either as a tension member or a compression member or both. Hereafter the member 17 will be termed the "strand" although it will be understood that this term is intended to include any suitable structure of the character just described. The strand is of greater length than the casing 12 with its ferrule 13 and has secured to opposite ends thereof rods 18 which serve as rigid terminal members for the strand. The rods may be secured to the strand in any suitable manner but preferably each rod is formed with a socket 19 bored in one end thereof into which an end of the strand is inserted, and then the parts are rigidly secured together by swedging. The rod 18, as clearly shown in Fig. 2, is of larger diameter than the bore of the ferrule or of the casing member and an annular shoulder 20 is formed at the junction of the rod and the strand which serves as a stop to limit movement of the strand within the casing. As shown in Fig. 1 the stop 20 at one end of the strand will engage the adjacent ferrule to prevent the opposite rod from moving clear of the sleeve surrounding the same.

The outer end of each rod may be threaded, as shown, for attachment to a forked fitting 21 adapted to embrace the end of one of the arms 10 or 11 to which it may be pivotally secured by a pin 22. Each sleeve 15 is formed near its outer end with an annular indentation 23 so as to form within the bore of the sleeve a bearing surface 24 which is convex in axial section. This bearing surface permits relative sliding movement of the rod 18 in the sleeve and also forms a fulcrum on which the rod may oscillate to accommodate itself to the arc of travel of the end of the arm 10 or 11 to which the rod is pivoted.

It will be understood that in practice the ferrules 13 are secured to fixed supports (not shown) so that as the arms 10 and 11 oscillate the strand must flex to permit of corresponding movement of the rods 18. Although the strand 17 is illustrated as occupying a rectilinear position it will be understood that the casing may be bent to any desired angle within practicable limits in accordance with common practice, and the arms 17 may also oscillate in different planes.

In assembling the power transmitting device one of the sleeves 15 is rigidly secured to one of the ferrule extensions and swedged thereto. Also one of the rods 18 is swedged to an end of the strand 17. Thereafter the strand 17 is passed through the attached sleeve and thence through the casing. The projecting end of the strand is now inserted in the socket 19 of the other rod 18 and is swedged thereto. The other sleeve 15 is then slipped over the rod 18 and upon the reduced portion 14 of the adjacent ferrule 13, after which it is swedged thereto by indenting it into the groove 16. The indentation 23 is formed in each sleeve 15 before it is secured to the casing. After the parts have thus been assembled the fittings 21 may be secured to the ends of the rods and the proper connections can be made to the driving and driven mechanism.

While it is more economical from a manufacturing point of view to make the two ends of the casing alike, it is obvious that one of the ferrules may be provided with an extension sleeve as an integral part thereof, and in such case the method of assembly would be the same as that described above with the exception that the step of swedging a sleeve upon the casing before introducing the strand into the casing is omitted.

Having thus described my invention what I claim as new and desire to secure by Letters Patent is as follows.

I claim:

1. A method of assembling a power transmitting device comprising a casing having a rigid sleeve extension at each end thereof and a strand having a rigid rod extension at each end thereof, each rod being too large in diameter to pass through the casing but adapted to slide freely in the sleeves, the spacing of the rods being such as to prevent drawing either rod clear of either sleeve, which method comprising the steps of rigidly affixing one of the sleeves to one end of the casing and one of the rods to an end of the strand, passing the opposite end of the strand through the affixed sleeve and thence through the casing, affixing the other rod to the latter end of the strand, passing the other sleeve over the latter rod, and affixing said sleeve to the casing.

2. A method of assembling a power transmitting device comprising a casing having a rigid sleeve extension at each end thereof and a strand having a rigid rod extension at each end thereof, each rod being too large in diameter to pass through the casing but adapted to slide freely in the sleeves, the spacing of the rods being such as to prevent drawing either rod clear of either sleeve, said method comprising the steps of swedging one of the sleeves upon one end of the casing, swedging one of the rods to an end of the strand, passing the opposite end of the strand through the attached sleeve and thence through the casing, swedging the other rod to the latter end of the strand, passing the other sleeve over the latter rod, and swedging said sleeve upon the adjacent end of the casing.

3. The method of forming a power transmitting device comprising a casing having a rigid sleeve extension at one end thereof and a strand passing through the casing, the strand having a rigid rod extension projecting through the sleeve but incapable of passing through the casing, and means on the strand at the opposite end of the casing and also incapable of passing through the casing, the spacing of the rod and of said means being such as to permit limited sliding movement of the strand in the casing but to prevent drawing the rod clear of the sleeve, which method comprises the steps of securing said means on the strand, thereafter passing the opposite end of the strand through the casing, swedging the rod on the latter end of the strand, sliding the sleeve over the rod and swedging the sleeve upon the casing.

4. The method of constructing and assembling a power transmitting device which comprises the steps of forming a flexible casing with a rigid sleeve extension of larger internal diameter than the casing, forming a flexible strand with a rigid rod extension at one end thereof, the rod being of too large a diameter to pass through the casing but of smaller diameter than the internal diameter of said extension, passing the strand through the casing with the rod extension projecting into the sleeve extension, attaching to the opposite end of the strand, a rigid rod of too large a diameter to pass through the casing, passing a sleeve over said rod and swedging the sleeve to the casing, the spacing between said rod and said rod extension being such as to permit sliding movement of the strand in the casing but to prevent drawing the rod extension and the rod clear of the sleeve extension and sleeve, respectively, and forming an annular depression in the sleeve and the sleeve extension near the outer ends thereof prior to assembly to form bearings for the rod and the rod extension.

5. A method of assembling a power transmitting device comprising a casing having a rigid sleeve extension, a strand within the casing having a rigid rod extension projecting through the sleeve but incapable of passing through the casing and means at the opposite end of the strand preventing the rod from being drawn out clear of the sleeve, the device also including a bearing for relative oscillation and sliding of the two extensions, which method consists in forming one of the extensions with said bearing, securing said means to the strand, passing the strand through the casing, swedging the rod upon the strand, sliding the sleeve over the rod, and swedging the sleeve upon the casing.

6. A method of assembling a power transmitting device comprising a casing having a rigid sleeve extension, a strand within the casing having a rigid rod extension projecting through the sleeve but incapable of passing through the casing and means at the opposite end of the strand preventing the rod from being drawn out clear of the sleeve, which method consists in forming an annular groove in the sleeve to provide a bearing through which the rod may slide and oscillate, securing said means to the strand, passing the strand through the casing, swedging the rod upon the strand, sliding the sleeve over the rod, and swedging the sleeve upon the casing.

OTTO BRATZ.